Feb. 16, 1943.  R. A. WEST ET AL  2,311,499
TOP TANK CONTROL
Filed Feb. 18, 1941  2 Sheets-Sheet 1
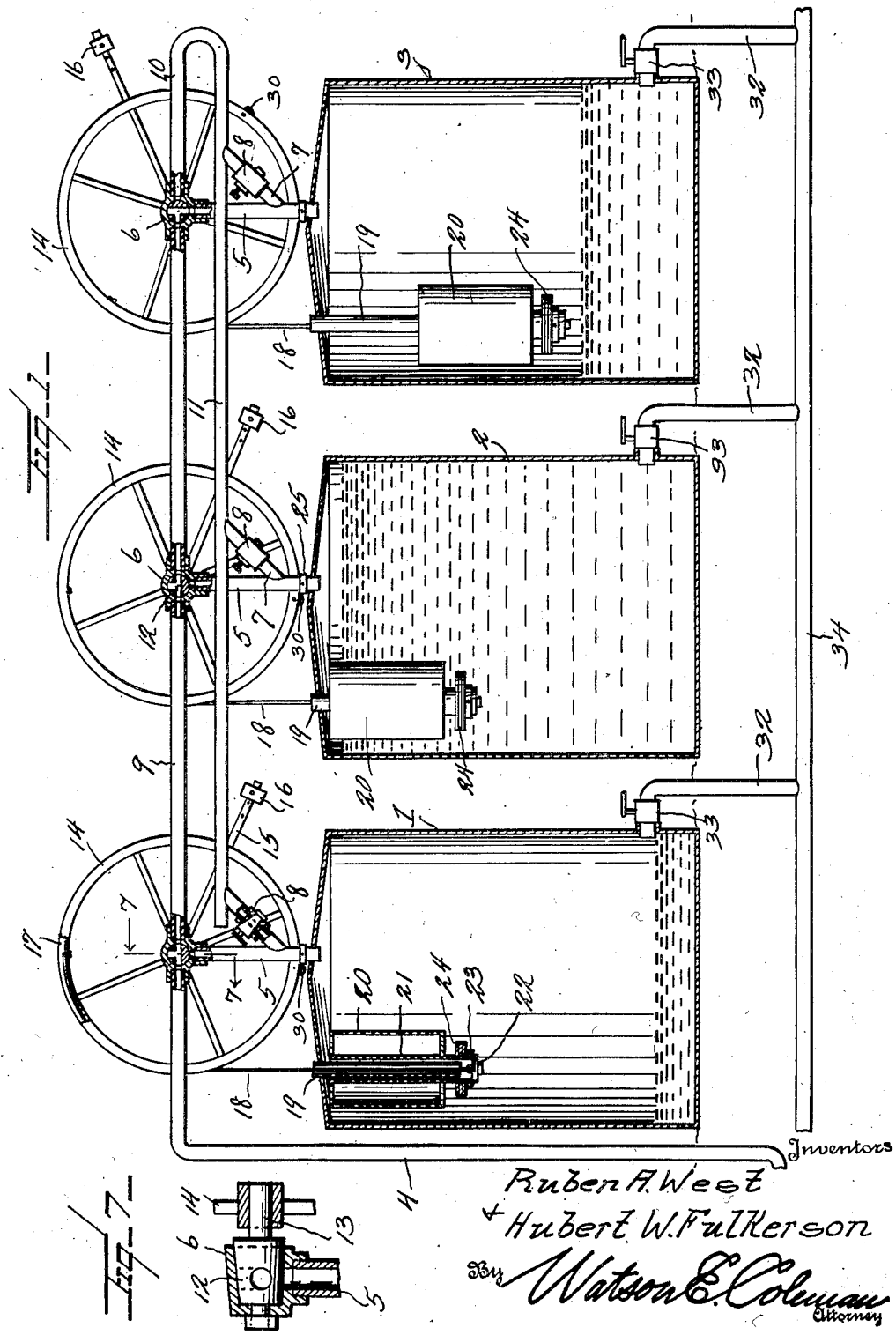
Inventors
Ruben A. West
& Hubert W. Fulkerson
By Watson E. Coleman
Attorney

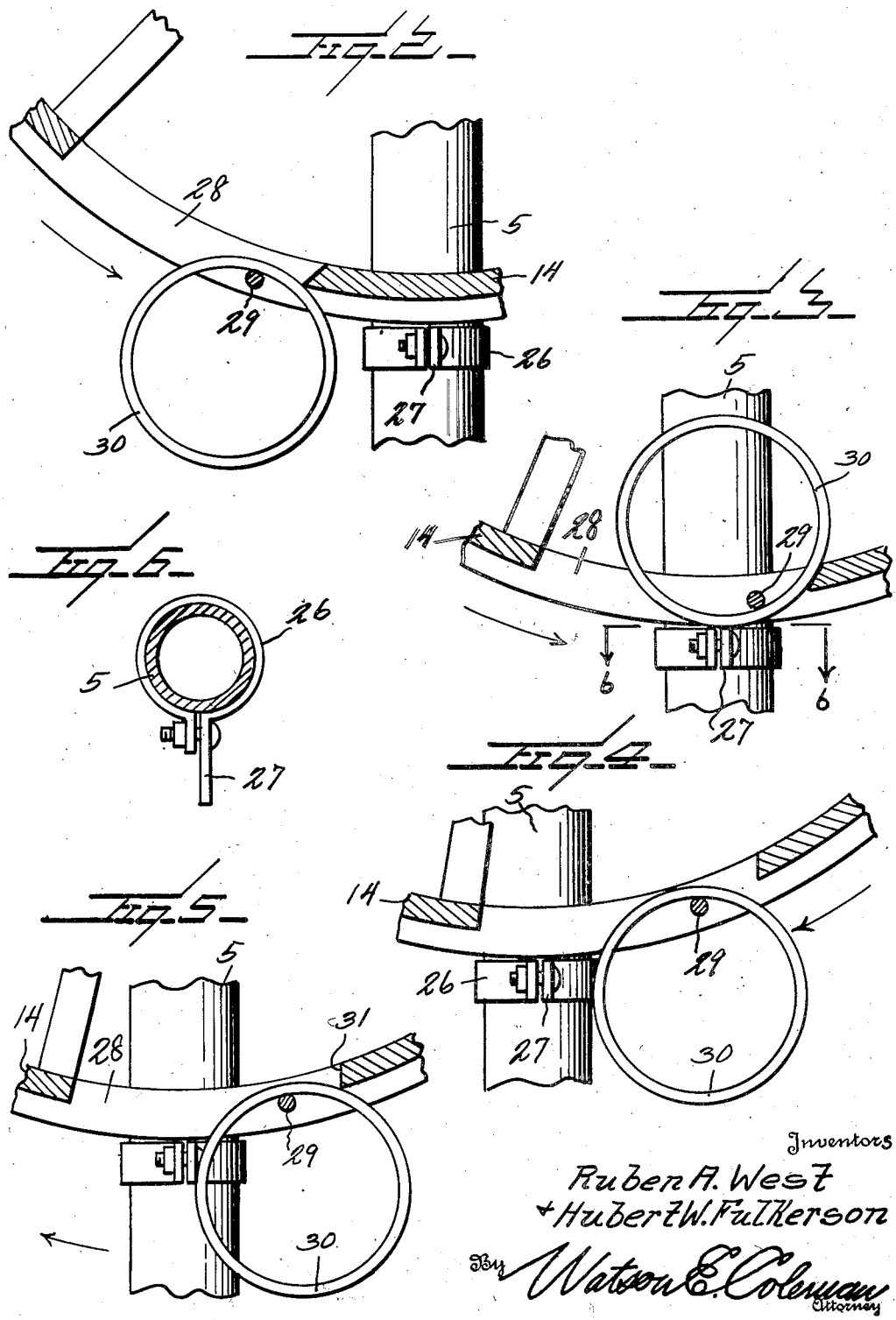

Patented Feb. 16, 1943

2,311,499

UNITED STATES PATENT OFFICE 2,311,499

TOP TANK CONTROL

Ruben A. West, Crossville, Ill., and Hubert W. Fulkerson, Muskogee, Okla.

Application February 18, 1941, Serial No. 379,502

4 Claims. (Cl. 137—68)

This invention pertains generally to oil receiving tanks such as are employed in oil fields for receiving oil from the wells and relates more particularly to an improved means for regulating the flow of the oil to such tanks.

In the oil fields the wells, whether of the flowing type or the type operated by pumps, are coupled with batteries of tanks through a supply line which runs from the well to the several tanks of a battery, there being provided at each tank a valve for shutting off the flow of oil into the tank from the line, such valve when shut causing the oil to pass on to the next tank. It is the duty of an attendant known as a "switcher," to watch out for these various tanks and to shut off the valve leading thereinto when the tank becomes filled, and if the switcher fails to do this, the tank overflows and creates not only a loss of oil but a waste of time and materials necessary for cleaning away the oil which has flowed over the outer side of the tank.

A primary object of the present invention is to provide an improved means whereby the several tanks of a battery will be protected against overflow by the provision of an automatically operating valve which will be turned to divert the flow of oil from one tank when it has become filled to the next empty tank, thus doing away with the necessity of the switcher being on hand when the tank fills.

Another object of the invention is to provide a top tank control of the character stated which is operated by a combination of weight and float means to effect the diversion of the inflowing oil from one tank when it becomes filled to the next empty tank.

Still another object of the invention is to provide a top tank control system for a battery of tanks in which means is provided to take care of overflow from the last tank of the battery whereby such overflow will be switched back to a tank which has been emptied.

The invention will be best understood from a consideration of the following detailed description taken in connection with the accompanying drawings, it being understood, however, that the invention is not to be considered as limited by the specific illustration or description but that such illustration and description constitutes a preferred embodiment of the invention.

In the drawings:

Fig. 1 illustrates the present invention in connection with a battery of three tanks.

Figs. 2, 3, 4 and 5 illustrate the several stages of operation of the locking means by which a valve turning wheel is secured when the wheel has been turned to the shut-off position of the valve with respect to the adjacent tank.

Fig. 6 is a sectional view on the line 6—6 of Fig. 3.

Fig. 7 is a sectional view on the line 7—7 of Fig. 1.

Referring now more particularly to the drawings, the numerals 1, 2 and 3 designate oil receiving tanks in which oil is discharged from a well, the supply pipe line leading from the well to the tanks being indicated by the numeral 4.

Extending upwardly from each of the tanks is an inflow pipe 5 which at its upper end is connected with one leg of a T-coupling 6. Each of these pipes 5 is also provided with the angle pipe 7 in which is an ordinary hand-operated valve 8 which may be of any type desired, but which is here shown as being of the rotary plug type.

The couplings 6 are connected in series by a distributing conduit or line 9, one end of which is connected with the main flow pipe 4, as shown. The pipe 4, of course, connects with the line 9 at one end of the battery, here shown as being adjacent the tank 1, while the other end of the line 9 extends beyond the coupling 6 of the last tank of the battery here shown as the tank 3, to the return bend 10 which connects with a back flow or return flow conduit or pipe line 11 which parallels the main flow line 9 and is coupled with the angle pipes or arms 7 of the tank inflow pipes 5.

The couplings 6 constitute housings for rotary valve plugs 12, each of which plugs has a stem 13 on which is keyed a weight and float operated and controlled wheel 14. The valve plugs 12 are of the three-way type and have two working positions. In one working position of the plug 12, the main flow line is open straight through as it is shown in connection with tanks 1 and 2, while in the second position of the valve plug the main flow line is blocked at the coupling but the oil is diverted into the adjacent tank inlet pipe 5, as shown in connection with tank 3.

Each wheel 14 has secured thereto and to the valve stem, a weight arm 15 upon the outer end of which is mounted a weight 16 which may be secured in any one of several adjusted positions longitudinally of the arm.

The wheel 14 is peripherally grooved, as indicated at 17, and in this groove is fixed an end of a cable 18 which extends partway around the wheel and downwardly into the tank through a tube 19 which has one end fixed in and extended through the top of the tank and extends downwardly into the tank, as shown in Fig. 1.

Within the tank is a float cylinder 20 through the center of which extends a pipe 21 which encircles the cable tube 19. The lower end of the pipe 21 has a head 22 secured therein to which is secured the other end of the cable 19 and there is also secured on the lower end of the pipe 21 a collar 23 which supports removable weights 24 by which the proper balancing weight is provided for the float to counterbalance the weight 16 on the wheel. As shown in Fig. 1, when the wheel 14 is turned to a position where the float is raised in the tank, the valve plug 12 will be in a position to shut off the admission of oil to the tank through the pipe 5, but permits the oil to pass on through the main flow pipe 9 to the next tank, and in this position also the weight 16 has been swung around to its lowermost position.

When the weight is in the lowered position and the valve 12 is disposed to shut off the flow of fluid into a tank through the pipe 5 leading thereto, a locking means automatically couples the wheel with the adjacent pipe 5, such locking means being generally designated in Fig. 1 by the numeral 25 and shown in detail in Figs. 2 to 5, inclusive. The means for automatically locking the wheel to the pipe 5 when the tank becomes filled comprises the following mechanism. The pipe 5 has secured thereto below the horizontal plane of the lowest part of the wheel 14, a split band or collar 26, one end of which is extended as shown in Fig. 6, to form a keeper arm 27. This arm extends across the periphery of the wheel.

Each wheel 14 is provided in the rim portion thereof with the radially opening circumferentially extending slot 28 across one end of which is a pin 29. The pin 29 passes through and supports a lock ring 30 and it will be seen that the space between the pin and the remote end of the slot is sufficient for the ring to move through the slot from the inside of the rim to the outside. The ring normally hangs from the pin 29 as shown in Fig. 2, and as the wheel 14 turns in a direction to move the ring toward the arm 27, the ring will be finally brought into contact with one side of the arm and will be caused to swing upwardly through the slot and roll over the top of the arm as shown in Fig. 3. When the pin 29 passes to a sufficient extent beyond the arm 27, the ring will drop through the slot and will then be suspended upon the opposite side of the arm 27 or between the arm and the end of the slot which is nearest the ring suspension pin 29. As shown in Fig. 5, any tendency for the wheel to then swing back in the direction of the arrow in this figure as, for example, when the fluid leaves the tank so as to permit the weighted float 20 to tend to lower, will be checked by the locking of the ring between the keeper arm 27 and the adjacent end of the slot which is here indicated by the numeral 31. In order to release the wheel, it will be necessary for the switcher to turn the wheel in the direction which it rotates under the influence of the weight 16 until a sufficient space is provided between the edge 31 of the slot and the arm 27 to permit the ring to be shifted back through the slot and allow it to pass back over the arm 27.

The tanks are connected with the bottom outlet pipes 32 which are controlled by exhaust valves 33 and these pipes 32 all connect with a common carry-off pipe line 34.

In the operation of the battery of tanks in accordance with the present invention, it will be seen that tank 1 has been filled and the control valve 12 is closed, leaving the main flow line 9 open through to tank 3. Tank 2 is filled as shown, and the float has raised, permitting the weight 16 to turn the wheel 14 and the control valve 12 to the position in which it is shown where it shuts off admission of further oil to tank 2 and permits the oil to pass on through to the control valve for tank 3. This tank is filling as shown, but the oil has not as yet begun to lift the float, therefore, since the weight of the float is slightly greater than the weight 16, the float maintains control of the wheel and control valve.

The tank 1 has in the meantime had the outlet valve 33 opened so that the oil may be drained off into the line 34 and when this tank is emptied, the switcher opens the back flow line valve 8 leading to tank 1, as shown. When this has been done, the switcher does not have to worry about tank 3 overflowing, because when this tank fills, the float will be raised and the control valve 12 associated therewith will be closed, but the oil may then continue to flow through the back flow line into tank 1 and the switcher may at his convenience come along and release the lock or wheel 14 of tank 1 to permit the float to lower and the control valve to be turned by such lowering to a position where the oil will be diverted from the main flow line 9 through the pipe 5 leading into tank 1. While the tank 1 is being filled, tank 2 may be emptying and after the oil level therein has dropped to the level of the outlet pipe, the outlet valve 33 may be shut and the valve 8 associated with tank 2 may be opened so that if the switcher is not on hand when tank 1 fills up and is shut off from receiving further oil, the oil may continue to flow through the main flow line and through the back flow line into tank 2.

From the foregoing, it will be readily apparent that with a top tank control mechanism of the character herein disclosed, a switcher may more conveniently take care of a large battery of tanks and the possibility of any one of the tanks overflowing is greatly reduced since the switching of the oil flow from one tank to another is automatically accomplished as the tanks fill. Also the novel means employed for locking the control wheels is simple and easily actuated and cannot get out of order so as to interfere with the operation of the mechanism.

What is claimed is:

1. A top tank control, comprising in association with a fluid tank, a supply line, an inlet pipe leading from the supply line into the tank, a valve between the supply line and the inlet pipe and adapted to be actuated to a through flow position in which fluid passes by the inlet pipe to a tank supply position in which the fluid is diverted through the pipe into the tank, a wheel connected with said valve, weight means carried by the wheel normally urging rotation of the latter in a direction to effect actuation of the valve to the through flow position, a weighted float disposed within the tank, a flexible coupling between the float and the periphery of the wheel, said float having sufficient weight to overcome the first weight whereby to actuate the valve to tank supply position when the tank is emptied and the wheel is free for rotation, the float being raised by fluid upon the filling of the tank whereby said weight means effects the turning of the wheel and actuation of the valve to the through flow position of the latter, means for locking said wheel against turning upon the raising of the float in the tank, comprising a keeper arm horizontally secured to extend across the periphery of the wheel, and a shiftable member carried by the wheel at its periphery and constructed so as to ride over the arm upon movement of the wheel in one direction and to lock between the wheel periphery and the arm to prevent movement of the wheel in the opposite direction.

2. In a mechanism including a rotatably supported wheel, means for locking said wheel after its rotation to a predetermined degree in one direction, comprising an arm member secured rigidly to extend transversely of and adjacent to the periphery of the wheel, said wheel having a slot in its periphery extending in a circumferential direction, a pin secured across the slot adjacent one end, a ring member suspended on the pin and movable through the slot radially of the wheel, said ring being adapted to be raised in the slot upon movement of the wheel in the said one direction and upon engagement of the ring with the arm whereby the ring rides over the arm and being movable in the opposite direction through the slot after the wheel has turned to a predetermined position in the said one direction to drop into a position between the arm and an end of the slot to lock the wheel against reverse rotation.

3. A tank top control comprising in association with a fluid tank, a fluid supply line, an inlet pipe leading from the supply line into the tank, a rotary valve between the supply line and the inlet pipe and adapted to be turned from a through flow position in which fluid passes by the inlet pipe to a tank supply position in which the fluid is diverted through the pipe into the tank, a wheel attached at its center to said valve to turn with and on the turning axis of the valve, weight means carried by the wheel and normally urging rotation of the wheel in a direction to turn the valve to the through flow position, a weighted float disposed within the tank, a flexible coupling between the float and the periphery of the wheel opposite said weight to cause the weights to oppose one another, said float having sufficient weight to overcome the first weight to effect turning of the valve to tank supply position when the tank is empty and the wheel is free for rotation, the float being raised by fluid filling the tank whereby the weight effects the turning of the wheel and of the valve to the through flow position of the valve, means for effecting the latching of the wheel against reverse rotation after the wheel has been turned by said weight to the through flow position of the valve, said latching means comprising an element fixedly supported adjacent the periphery of the wheel, and a shiftable element carried by the wheel at the periphery thereof and constructed and arranged to ride over the fixed element when the wheel has turned to the through flow position of the valve and to abut the fixed element on one side to prevent the stated reverse rotation of the wheel.

4. In mechanism of the character stated including a member pivoted for turning movement about a pivotal center, means for locking said member after a predetermined degree of turning in one direction, comprising a portion of said member of arcuate form and concentric with the turning axis of the member, said portion having a longitudinal slot, a pin secured across said slot adjacent one end, a ring member suspended on the pin and movable through the slot in a direction radially of the turning axis of the member, an arm secured rigidly to extend transversely of and adjacent to the said slotted portion of the member, said ring being adapted to be raised in the slot upon movement of the member in the said one direction and upon engagement of the ring with the arm whereby the ring rides over the arm and being movable in the opposite direction through the slot after the member has turned to a predetermined position in the said one direction to drop back into a position between the arm and an end of the slot to secure the member against reverse turning movement.

RUBEN A. WEST.
HUBERT W. FULKERSON.